(12) United States Patent
Jeong et al.

(10) Patent No.: US 9,900,399 B2
(45) Date of Patent: Feb. 20, 2018

(54) METHOD FOR OPERATING MACHINES AND SYSTEM USING THE SAME

(71) Applicant: ELECTRONICS AND TELECOMMUNICATIONS RESEARCH INSTITUTE, Daejeon (KR)

(72) Inventors: Young-Sic Jeong, Daejeon (KR); Sang-Keun Yoo, Sejong (KR); Jin-Young Lee, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 234 days.

(21) Appl. No.: 14/931,188

(22) Filed: Nov. 3, 2015

(65) Prior Publication Data

US 2016/0127502 A1    May 5, 2016

(30) Foreign Application Priority Data

Nov. 3, 2014    (KR) .................... 10-2014-0151327
Nov. 3, 2014    (KR) .................... 10-2014-0151328
Jan. 23, 2015   (KR) .................... 10-2015-0011217
Jun. 30, 2015   (KR) .................... 10-2015-0093337
Oct. 19, 2015   (KR) .................... 10-2015-0145571
Nov. 3, 2015    (KR) .................... 10-2015-0153921

(51) Int. Cl.
*G06F 15/16*    (2006.01)
*H04L 29/08*    (2006.01)
(Continued)

(52) U.S. Cl.
CPC ............ *H04L 67/303* (2013.01); *G06F 1/266* (2013.01); *G06F 1/3203* (2013.01); *G06F 1/3253* (2013.01); *G06F 9/5044* (2013.01); *G06Q 10/06* (2013.01); *G06Q 10/06311* (2013.01); *H04L 69/24* (2013.01)

(58) Field of Classification Search
CPC ...... G06F 1/266; G06F 1/3203; G06F 1/3253; G06Q 10/06311; G06Q 10/06
See application file for complete search history.

(56) References Cited

U.S. PATENT DOCUMENTS

2010/0324948 A1* 12/2010 Kumar ............. G06Q 10/06311
                                                          705/7.13
2011/0145556 A1*  6/2011 Hakoun ................. G06F 1/266
                                                             713/1
(Continued)

FOREIGN PATENT DOCUMENTS

KR    10-2014-0109940    9/2014
WO    2013/106204        7/2013

*Primary Examiner* — Kyung H Shin
(74) *Attorney, Agent, or Firm* — Kile Park Reed & Houtteman PLLC

(57) ABSTRACT

Disclosed herein are a method for operating machines and a system using the method, which can manage relations required in order to execute commands. The method includes generating a capability set required to execute the command by analyzing the command, and determining whether to participate in a machine group to execute the commands based on the generated capability set and capability parameters and status parameters of the machine.

17 Claims, 3 Drawing Sheets

(51) Int. Cl.
*G06F 1/32* (2006.01)
*G06Q 10/06* (2012.01)
*G06F 1/26* (2006.01)
*H04L 29/06* (2006.01)
*G06F 9/50* (2006.01)

(56) References Cited

U.S. PATENT DOCUMENTS

2012/0054065 A1  3/2012  Sung et al.
2014/0177605 A1  6/2014  Kwon et al.
2014/0317261 A1  10/2014  Shatzkamer et al.

* cited by examiner

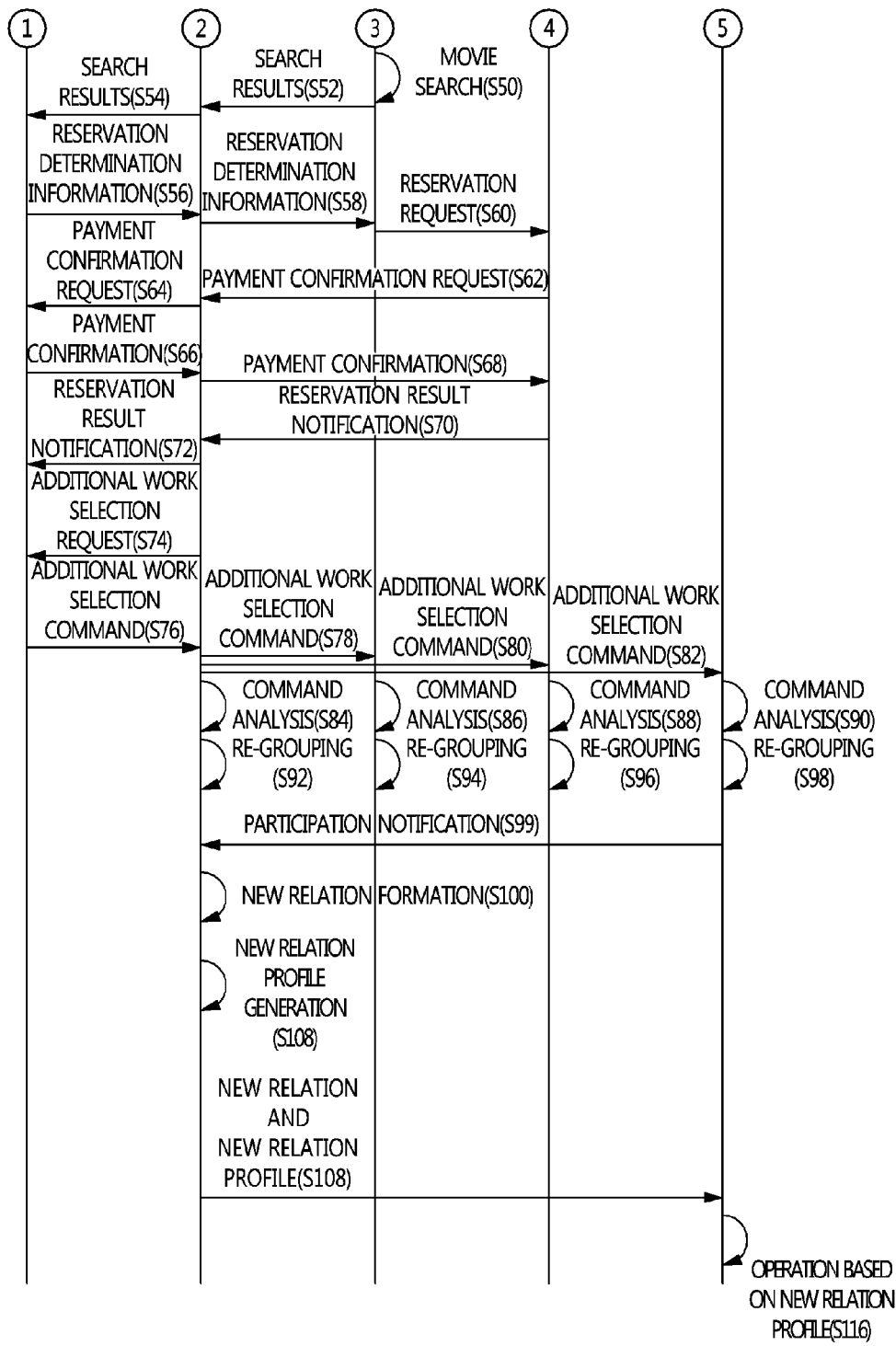

METHOD FOR OPERATING MACHINES AND SYSTEM USING THE SAME

CROSS REFERENCE TO RELATED APPLICATIONS

This application claims the benefit of Korean Patent Application Nos. 10-2014-0151328, filed Nov. 3, 2014, 10-2014-0151327, filed Nov. 3, 2014, 10-2015-0011217, filed Jan. 23, 2015, 10-2015-0093337, filed Jun. 30, 2015, 10-2015-0145571, filed Oct. 19, 2015 and 10-2015-0153921, filed Nov. 3, 2015 which are hereby incorporated by reference in their entirety into this application.

BACKGROUND OF THE INVENTION

1. Technical Field

Embodiments based on the concept of the present invention generally relate to a method for operating machines and a system using the method and, more particularly, to a method for operating machines and a system using the method, which manage relations between machines that are required in order to execute externally received commands.

2. Description of the Related Art

Recently, systems for connecting machines through a network and sharing information between the machines have been applied to various fields, such as health care, telemetry, smart homes, and smart cars, as well as household appliances and electronic devices.

Therefore, when various machines form collaborative relations, methods for managing the relations between the machines are required.

SUMMARY OF THE INVENTION

Accordingly, the present invention has been made keeping in mind the above problems occurring in the prior art, and an object of the present invention is to provide a method for operating machines and a system using the method, which manage relations between machines that are required in order to execute externally received commands.

In accordance with an aspect of the present invention to accomplish the above object, there is provided a method for operating machines, the method operating each machine capable of managing relations required to execute a command, including analyzing the command and generating a capability set required to execute the command, and determining whether to participate in a machine group that is to execute the command, based on the generated capability set and a capability parameter and a status parameter of the machine.

The capability parameter may include a sub-parameter related to at least one of a title of an executable process, an input parameter, an output parameter, a process processing time, a process processing condition, and executable functions.

The status parameter may include a sub-parameter related to at least one of a current active state, current availability or unavailability, a current process, a scheduled termination time for the current process, a currently executed task, a currently executed function, and a scheduled termination time of the currently executed function.

A machine profile including information about the machine may include the capability parameter and the status parameter, and the machine profile may further include at least one of a machine ID parameter, a user ID parameter, a group ID parameter, a machine operating system parameter, and a machine interface parameter.

The machine operating system parameter may include a sub-parameter related to a type and a version of an operating system of the machine.

The machine interface parameter may include a sub-parameter related to interfaces and interface protocols between the machine and other machines.

The method may further include transmitting a notification about whether to participate in the machine group, the capability set, the capability parameter and the status parameter to a coordinating machine of the machine group when to participate in the machine group is determined.

The method may further include receiving a capability set, a capability parameter and a status parameter from other machine which determined to participate in the machine group, and forming a relation of the machine group based on the transmitted capability set, capability parameter and the status parameter.

The relations may include information about a task processing schedule of the machine that participate in the machine group.

The method may further include generating a relation profile based on the relations, and transmitting the generated relation profile and the relation to the other machine.

The work relation may include at least one of a capability set parameter, a grouped machine parameter, a work group ID parameter, a task description parameter, and a task processing schedule parameter.

The task processing schedule parameter may include a sub-parameter related to at least one of a process start time for each process, a process start condition, machine IDs of allocated machines, function that are used, a predicted termination time of the function, an interface parameter, and process termination conditions.

The method may further include operating machines according to a sequence of operations included in the relation profile.

The method may further include, after completing an execution of the command, releasing the formed relations.

The method may further include requesting an intervention of a user according to a process included in the relation profile.

The intervention of the user may include an approval or a selection of the user related to an execution of the process.

The method may further include re-grouping the machines according to the approval of the selection of the user, and forming new relations for the re-grouped machines.

The method may further include generating a new relation profile based on the new relations.

In accordance with another aspect of the present invention to accomplish the above object, there is provided a system including multiple machines, each capable of managing a relation between machines required to execute a command, wherein each of the machines analyzes the command, generates a capability set required to execute the command, and determines whether to participate in a machine group that is to execute the command, among the multiple machines, based on the generated capability set and a capability parameter and a status parameter of the respective machines

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
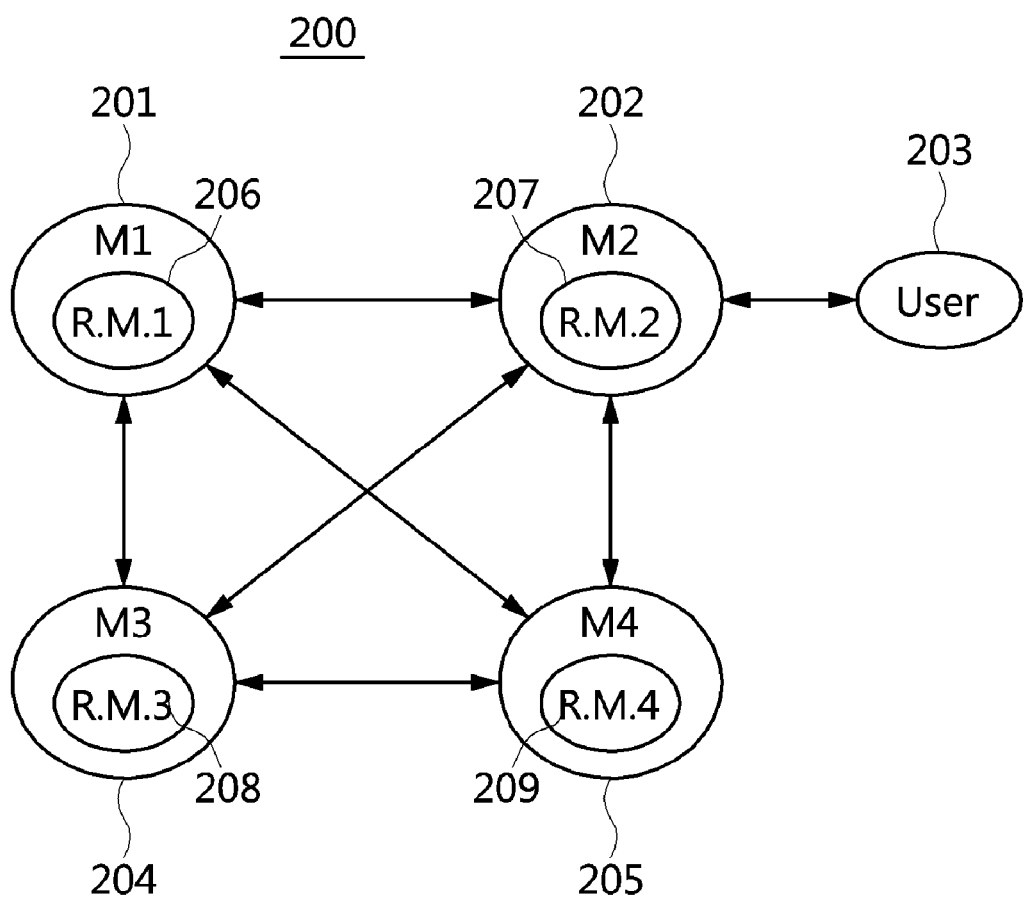
FIG. 1 is a conceptual diagram showing a system according to an embodiment of the present invention; and FIG. 2A

Specific structural or functional descriptions related to embodiments based on the concept of the present invention and disclosed in the present specification are merely illustrated to describe embodiments based on the concept of the present invention, and the embodiments based on the concept of the present invention may be implemented in various forms and should not be interpreted as being limited to the above embodiments described in the present specification.

The embodiments based on the concept of the present invention may be modified in various manners and may have various forms, so that embodiments are intended to be illustrated in the drawings and described in detail in the present specification. However, it should be understood that those embodiments are not intended to limit the embodiments based on the concept of the present invention to specific disclosure forms and they include all changes, equivalents or modifications included in the spirit and scope of the present invention.

The terms such as "first" or "second" may be used to describe various components, but those components should not be limited by the terms. The terms are merely used to distinguish one component from other components, and a first component may be designated as a second component and a second component may be designated as a first component in the similar manner, without departing from the scope based on the concept of the present invention.

It should be understood that a representation indicating that a first component is "connected" or "coupled" to a second component may include the case where the first component is connected or coupled to the second component with some other component interposed therebetween, as well as the case where the first component is "directly connected" or "directly coupled" to the second component. In contrast, it should be understood that a representation indicating that a first component is "directly connected" or "directly coupled" to a second component means that no component is interposed between the first and second components. Other representations describing relationships among components, that is, "between" and "directly between" or "adjacent to," and "directly adjacent to," should be interpreted in similar manners.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof that are described in the present specification are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

FIG. 1 is a conceptual diagram showing a system according to an embodiment of the present invention.

A system 200 according to an embodiment of the present invention executes a command via communication between machines 201, 202, 204, and 205, and does not include a separate server.

In FIG. 1, for the convenience of description, a user 203 is illustrated together with the above components, and may be a user or a user terminal.

Although four machines 201, 202, 204, and 205 are illustrated in FIG. 1 by way of example, the technical scope of the present invention should not be construed as being limited to any specific number of machines included in the system 200.

Each of multiple machines 201, 202, 204, and 205 may have its own machine profile.

The "machine profile" refers to data including various types of information related to the corresponding machine 201, 202, 204, or 205. According to an embodiment, the machine profile may include at least one of the parameters of the machine profile presented in the following Table 1. Each of the machine profile parameters may include at least one sub-parameter.

In the present specification, the term "sub-parameter" may denote a parameter including detailed items for the corresponding parameter.

TABLE 1

| Parameters of machine profile | Sub-parameters |
|---|---|
| Status | Current operation (active) state |
| | Current availability or unavailability (standby) |
| | Current process |
| | Scheduled termination time of current process |
| | Currently executed function |
| | Scheduled termination time of currently executed function |
| | Title of process |
| | Input parameter |
| | Output parameter |
| | Process processing time |
| Capability | Process processing condition(s) |
| | Function 1 |
| | Function 2 |
| | . . . |
| | Function n |
| Machine ID | — |
| User ID | — |
| Group ID | — |
| Machine operating system | Operating system type |
| | Operating system version |
| Machine interface | Interface protocol(s) between machines |
| | Interface parameter(s) between machines |
| | Interface protocol(s) between machines and relation server |
| | Interface parameter(s) between machines and relation server |

Referring to Table 1, the sub-parameters of the status parameter may include the current active state of each of the machines 201, 202, 204, and 205, information about whether each of the machines 201, 202, 204, and 205 is currently available or unavailable (i.e. in a standby state), a current process, a scheduled termination time for the current process, the currently executed function, and the scheduled termination time of the currently executed function.

The currently executed function may denote the function that is currently being executed among various functions that are executed in order to perform a single process. For example, the currently executed function may be a function such as 'washing', 'rinsing', or 'spin-drying', performed for the process 'laundering'.

The sub-parameters of the capability parameter may include the title of a process, which can be processed by each of the machines 201, 202, 204, and 205, an input parameter, an output parameter, a process processing time, a process processing condition, and multiple functions related to the executable task (function 1, function 2, function 3, . . . , function n). The input parameter may refer to information that is input in order to operate the corresponding machine, and the output parameter may refer to information that is output from the corresponding machine depending on the results of operation.

The machine ID parameter denotes a unique identifier allocated to each of the machines 201, 202, 204, and 205 to identify each of the machines 201, 202, 204, and 205.

The user ID parameter denotes a unique identifier allocated to a user who is capable of utilizing each of the machines 201, 202, 204, and 205.

The group ID parameter denotes a unique identifier allocated to a user group (e.g. members of a family, members of a specific company, etc.) that is capable of utilizing each of the machines 201, 202, 204, and 205.

The sub-parameters of the machine operating system (OS) parameter may include the type and version of the OS that is used by each of the machines 201, 202, 204, and 205.

The sub-parameters of the machine interface parameter may include interface protocols between the machines 201, 202, 204, and 205, interface parameters between the machines 201, 202, 204, and 205, interface protocols between each machine 201, 202, 204, or 205 and a relation server, and interface parameters between each machine 201, 202, 204, or 205 and the relation server.

Since the system 200 of FIG. 1 does not include a separate server, the machine interface parameter may not include interface protocols between each machine 201, 202, 204, or 205 and the server and interface parameters between each machine 201, 202, 204, or 205 and the server, or, alternatively, the interface protocols and the interface parameters may be set to default values.

In accordance with an embodiment, the machine profile may be defined and implemented in the form of a schema having a hierarchical structure. That is, the machine profile may be defined and implemented as a data structure having a structure system such as that given in Table 1. In this case, the machine profile may further include a tag, indicating the last portion of each parameter (or machine profile), in the last portion of each parameter (or the last portion of the machine profile).

The machines 201, 202, 204, and 205 included in the system 200 include respective relation modules (RMs) 206, 207, 208, and 209, which may be connected to each other over a wireless network.

Each relation module (e.g. 206, 207, 208 or 209) may generate a capability set required to execute a command input from the user 203, and may group a relevant machine (e.g. 201) and other machines 202, 204, and 205 based on the generated capability set.

That is, each relation module (e.g. 206, 207, 208 or 209) may generate a capability set required to execute the command input from the user 203, and may determine whether to participate in a machine group, which will execute the command, based on the generated capability set and the machine profile (e.g. capability parameters and status parameters) stored in the respective machines 201, 202, 204 or 205.

Each relation module 206, 207, 208, or 209 may analyze the command input from the user 203 and determine whether the machines 201, 202, 204, and 205, including the respective relation modules 206, 207, 208, and 209, may be used to execute the command. Depending on the results of the determination, required functions may be executed at required times based on the capability parameters and the status parameters of the machine profiles of the respective relation modules 206, 207, 208, and 209.

In the present specification, the term 'analysis of a command' may be used interchangeably with the term 'analysis of a task corresponding to a command'.

According to an embodiment, the machine 202 which received the command from the user for the first time may operate as a coordinating machine to manage the machine group to perform the command. According to another embodiment, a machine to which the command of the user 203 is delivered may operate as the coordinating machine.

When the second machine 202 operates as the coordinating machine, other machines (e.g. 201, 204, and 205), which are determined to participate in the machine group to perform the command, may transmit a notification about whether to participate, the capability set, the capability parameter and the status parameter of each machine (e.g. 201, 204, or 205) to the coordinating machine (e.g. 202).

And, the coordinating machine (e.g. 202) may receive the capability set, the capability parameter and the status parameter transmitted from other machines (e.g. 201, 204, and 205), and may form relations of the machine group based on the received capability set, the capability parameter and the status parameter. The coordinating machine (e.g. 202) may generate a relation profile based on the formed relations, may share the generated relation profile with the other machines (e.g. 201, 204, and 205).

The term 'relation' in the present specification may mean a concept including not only machines (i.e. a machine group) associated to collaborate with each other on a task, but also a task processing schedule (e.g. the sequence of operations, a task collaborative relation, etc.) required to allow the machines to perform the task.

According to an embodiment, the coordinating machine (e.g. 202) may request an intervention of a user to the user 203 according to the processes included in the relation profile. The intervention of the user may include an approval or a selection of the user related to an execution of the processes. In this case, the user 203 may transmit a result of the approval for all of the processes or the selection for a part of the processes to the coordinating machine (e.g. 202), by responding to the request from the coordinating machine (e.g. 202). The said user intervention step may be performed at various times according to an embodiment. For example, the intervention of the user may be performed after the relation profile is generated or be performed before an addition work is conducted.

According to another embodiment, the coordinating machine (e.g. 202) may request the intervention of the user to the user 203 only when a process result of the processes included in the relation profile make a critical effect on the user 203.

The coordinating machine (e.g. 202) may re-group the machines 201, 202, 204, and 205 according to the intervention (e.g. the approval of the selection) of the user 203, and may generate a new relations of the re-grouped machines. And, the coordinating machine (e.g. 202) may generate a new relation profile according to the new relations.

According to an embodiment, each relation profile may include at least one of the parameters presented in the following Table 2. Each of the parameters of the relation profile may include at least one sub-parameter.

The term "task" in the present specification may mean a set of tasks (or functions) that need to be performed based on the results of analyzing the command input from the user 203. And, the term "relation profile" in the present specification may broadly mean data representing relations formed to perform a task.

TABLE 2

| Parameters of relation profile | Sub-parameters |
| --- | --- |
| Capability set | Capability 1 |
|  | ... |
|  | Capability n |
| Grouped machines | Machine ID 1 |
|  | ... |
|  | Machine ID n |
| Work group ID | — |
| Task description | — |
| Task processing schedule | Process 1 |
|  | Process start time |
|  | Process start condition(s) |
|  | Allocated machine ID |
|  | Start time of function 1 |
|  | Function 1 |
|  | ... |
|  | Start time of function n |
|  | function n |
|  | Predicted termination time of process 1 |
|  | Interface parameter |
|  | Termination condition(s) of process 1 |
|  | ... |
|  | Process n |
|  | Process start time |
|  | Process start condition(s) |
|  | Allocated machine ID |
|  | Start time of function 1 |
|  | function 1 |
|  | ... |
|  | Start time of function n |
|  | Function n |
|  | Predicted termination time of process n |
|  | Interface parameters |
|  | Termination condition(s) of process n |

Referring to Table 2, the parameters of the relation profile may include a capability set parameter, grouped machine parameters, a work group ID parameter, a task description parameter, a task processing schedule parameter, etc.

The capability set parameter may include information about capability parameters, which are required for relevant task, and machines may be grouped based on the capability set parameters.

The grouped machine parameters may include information about the machine IDs (machine ID 1, ..., machine ID n) of machines grouped to perform the relevant task.

The work group ID parameter may denote the ID required to identify the entire group of the grouped machines.

The task description parameter may include various types of additional information related to the relevant task. For example, the task description parameter may include details about the tasks for the relevant task in the form of text.

The task processing schedule parameter may include relations (e.g. a processing sequence) between multiple processes (process 1, ..., process n) and sub-parameters related to the respective processes (process 1, ..., process n).

According to an embodiment, the sub-parameters of the task processing schedule parameter may include the process start time of each process, the start condition(s) of each process, the machine IDs of machines allocated, the functions used, the start time of each of the functions, the predicted termination time of the process, interface parameters, the termination condition(s) of the process, etc.

According to an embodiment, the relation profile may be defined and implemented in the form of a schema having a hierarchical structure. That is, the relation profile may be defined and implemented as a data structure having a structure system, such as that given in Table 2. In this case, the relation profile may further include a tag, indicating the last portion of each parameter (or the relation profile), in the last portion of each parameter (or the last portion of the relation profile).

In the present specification, the term "capability set" may be used as a concept having a level which is equivalent to the task. For example, work, that is, a capability set corresponding to a task, such as "housework" may be composed of processes (or functions) such as "cleaning", "doing the dishes", and "doing the laundry".

At least one of the machines 201, 202, 204, and 205, for example, the coordinating machine (e.g. 202), may list respective machine ID parameters of the machines 201, 202, 204, and 205 that are grouped to execute a command, and may arrange the listed machine ID parameters according to the sequence of operations suitable for the execution of the command.

In this case, in the arrangement corresponding to the operation sequence, the status parameters of respective machines 201, 202, 204, and 205 may be taken into consideration. For example, when a relevant machine is found to be currently in an active state using the sub-parameters of the machine 201, 202, 204, or 205, the sequence of operations may be arranged in consideration of available times using the scheduled termination time parameter for the current active state.

For example, when a relevant machine is found to be currently in an available state using the sub-parameter indicating current availability or unavailability (standby state), among the sub-parameters of the machine 201, 202, 204, or 205, the operations of the machines may be arranged according to the sequence most suitable for the execution of the command.

At least one of the machines (e.g. 202) may execute the command received from the user 203 by requesting tasks from another machine 201, 204, or 205 according to the determined operation sequence.

The overall operation of the system 200 will be described in greater detail below with reference to the scenario of FIG. 2A and FIG. 2B.

Figure 2A:
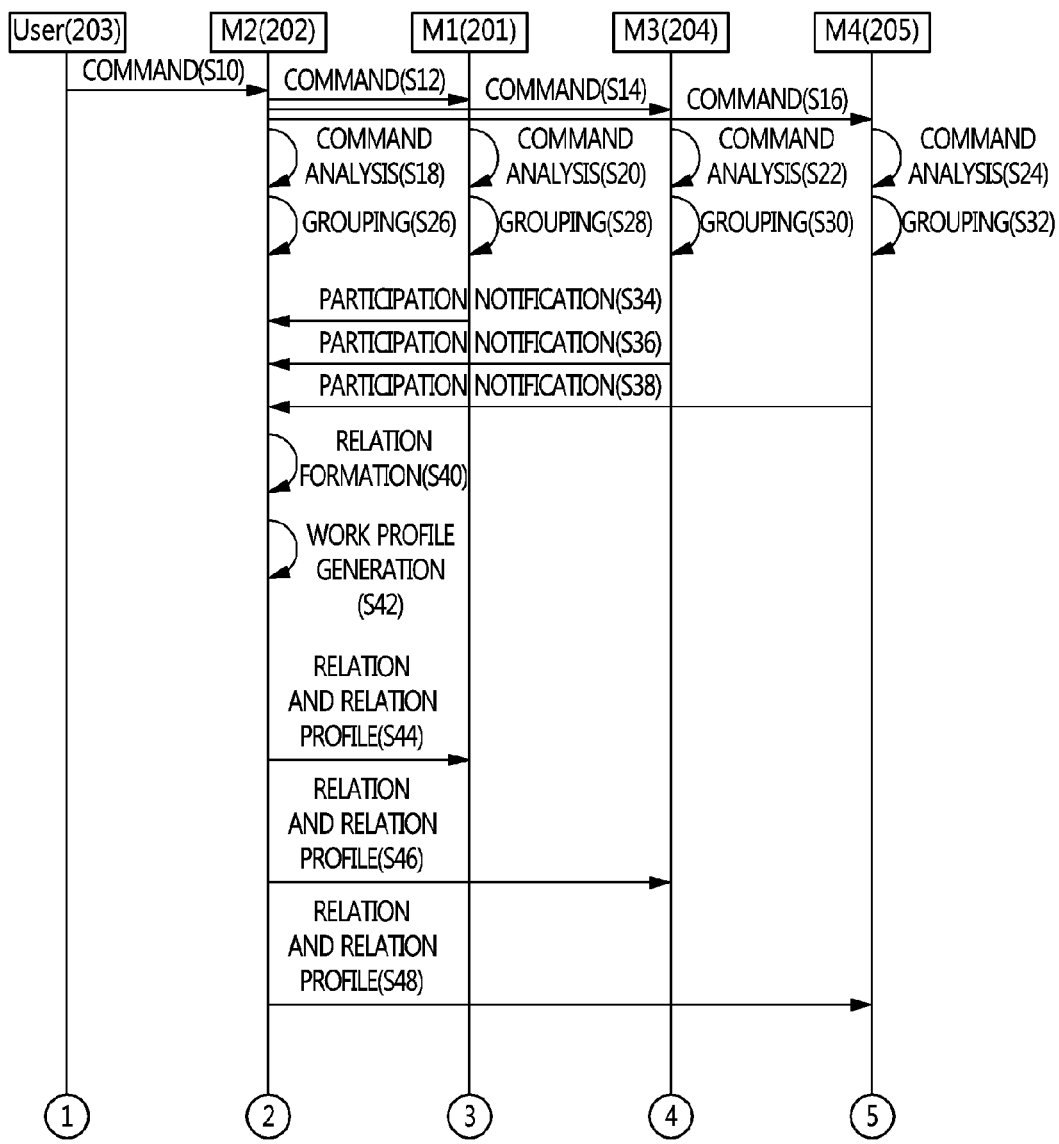
FIG. 2B illustrates an embodiment of a scenario that can be applied to the system of FIG. 1.

FIG. 2A and FIG. 2B illustrates an embodiment of a scenario that can be applied to the system of FIG. 1.

Referring to FIGS. 1, 2A, and 2B, it is assumed that the first machine 201 is a movie search engine, the second machine 202 is a smart phone, the third machine 204 is a machine having a movie reservation function (e.g. a communication terminal in which a movie reservation application is installed), and the fourth machine 205 is a boiler control machine having a communication function.

For example, the user 203 may transmit a command to the second machine 202 at step S10. According to an embodiment, the command may be received via email, a social network service (SNS), or a messenger.

The relation module 207 of the second machine 202 may individually forward the command received from the user 203 to other machines 201, 204, and 205 at steps S12, S14, and S16.

Each of the machines 201, 202, 204, and 205 may analyze the received command at steps S18, S20, S22, and S24, generate a capability set required to execute the command based on the results of the analysis, and group machines 201, 202, 204, and 205, which will collaborate in the execution of the command, based on the generated capability set at steps S26, S28, S30, and S32.

For example the relation module 206, 207, 208, or 209 included in each of the machines 201, 202, 204, and 205 may determine whether to participate in a machine group required to execute the command, based on the capability set, the capability parameters and the status parameters of the respective machines 201, 202, 204, and 205.

Each of the other machines (e.g. 201, 204, and 205) which are determined to participate in the machine group required to execute the command may transmit a notification about whether to participate in the machine group from the user 203 to the coordinating machine (e.g. 202) at steps S34, S36 and S38. At this time, the other machines 201, 204 and 205 may transmit the capability set, the capability parameters and the status parameters of the respective machines 201, 202, 204, and 205 with the notification about whether to participate in the machine group to the coordinating machine (e.g. 202).

The coordinating machine (e.g. 202) may form relations between the machines 201, 202, 204, and 205, based on the capability set, the capability parameters and status parameters of the respective machines 201, 202, 204, and 205 that participate in the machine group at step S40.

The coordinating machine (e.g. 202) may generate a relation profile according to the formed relations at step S42.

The coordinating machine (e.g. 202) may transmit the generated relations and the relation profile to the other machines 201, 204 and 205 included in the machine group at steps S44, S46, and S48.

Next, each of the machines 201, 202, 204, and 205 may perform management so that the corresponding machine performs a required operation at a required time depending on the generated relation profile or the received relation profile.

The first machine 201 may search for information about movies that meet movie search condition (e.g. a movie title, a movie theater, a synopsis, a running time, or the like) input from the user 203, according to the operation sequence determined using the relation profile at step S50. The first machine 201 may transmit the found movie information to the user 203 via the second machine 202 at steps S52 and S54.

The user 203 enters information about determination to make a reservation (e.g. the selected movie, the selected movie theater, the movie start time, the number of tickets to be reserved, etc.) in response to the found movie information, and may deliver the information about the determination to make a reservation (reservation determination information), together with a reservation command, to the first machine 201 via the second machine 202 at steps S56 and S58.

The second machine 202 may transmit a reservation request to the third machine 204 based on the received reservation determination information at step S60.

The third machine 204 may reserve the movie corresponding to the reservation determination information and may transmit a payment confirmation request to the user 203 through the second machine 202 at steps S62 and S64.

The user 203 may transmit payment confirmation to the third machine 204 via the second machine 202 at steps S66 and S68.

The third machine 204 may reserve the movie in response to the payment confirmation from the user 203 and may provide notification of the results of the reservation to the user 203 via the second machine 202 at steps S70 and S72.

The second machine 202 may transmit a request, which is required in order to obtain the selection or approval of additional works that can be additionally performed in compliance with the command of the user 203 transmitted at step S10, to the user 203 at step S74.

According to an embodiment, the second machine 202 may transmit information about a list of additional works, information about machines for processing the additional works, and information about the sequence (or schedule), in which the additional works are to be processed, to the user 203.

The user 203 selects and inputs additional works to be conducted, and may transmit a command for selecting the input additional works to the second machine 202 at step S76.

The second machine 202 may forward the additional work selection command to the first machine 201, the third machine 204, and the fourth machine 205 at steps S78, S80, and S82.

Each of the machines 201, 202, 204, and 205 may analyze the additional work selection command transmitted from the user 203 at steps S84, S86, S88, and S90, generate a capability set required to execute the command, based on the results of analysis, and re-group the machines 201, 202, 204, and 205, which will collaborate in the performance of the additional works selected by the user 203, based on the generated capability set, at steps S92, S94, S96, and S98.

That is to say, each of the machines 201, 202, 204, and 205 may determine whether to participate in a machine group to perform the additional work selected by the user 203 based on the generated capability set.

The machine (e.g. 205) which is determined to participate in the machine group to perform the additional work may transmit the capability set, the capability parameter and the status parameter with information of whether to participate to the coordinating machine (e.g. 202) at step S99.

The coordinating machine (e.g. 202) may form new relations of the machine group to perform the additional work based on the received capability set, the capability parameter and the status parameter at step S100, and may generate a new relation profile based on the formed new relations at step S108.

Thereafter, the coordinating machine (e.g. 202) may transmit the generated new relations and the new relation profile to the fourth machine 205. And, the fourth machine 205 may perform required operations at required times based on the new relation profile at step S116.

For example, the fourth machine 205 may schedule the operation of a boiler so that the boiler is driven in accordance with the time at which the movie is to be terminated based on movie reservation information.

According to an embodiment, after the execution of the command has been completed, the relation modules 206, 207, 208, and 209 of the respective machines 201, 202, 204, and 205 may release the formed relations and delete the relation profiles.

In this way, the system 200 of FIG. 1 does not include a separate server for managing all of the machines 201, 202, 204, and 205. The relation modules 206, 207, 208, and 209 included in the respective machines 201, 202, 204, and 205 may form relations between the machines 201, 202, 204, and 205 while sharing the machine profiles and data to be transmitted/received with each other, thus processing the command from the user 203.

Although the present invention has been described with reference to the embodiments illustrated in the drawings, those skilled in the art will understand that various modifications and other equivalent embodiments are possible from the above embodiments. Therefore, the technical scope of the present invention should be defined by the technical spirit of the accompanying claims.

The method according to the embodiments may be implemented as a program that can be executed by various computer means. In this case, the program may be recorded on a computer-readable storage medium. The computer-readable storage medium may include program instructions, data files, and data structures solely or in combination. Program instructions recorded on the storage medium may have been specially designed and configured for the present disclosure, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine language code, such as code created by a compiler, and high-level language code executable by a computer using an interpreter. The hardware devices may be configured to operate as one or more software modules in order to perform the operation of the present disclosure, and vice versa.

The method and system according to embodiments of the present invention are advantageous in that machines to execute a command may be grouped based on the capability parameters and the status parameters of machines, and optimal relations between the machines grouped to execute the command may be formed.

As described above, although the embodiments have been described with reference to a limited number of embodiments and drawings, those skilled in the art will appreciate that various changes and modifications are possible from the above descriptions. For example, even if the above-described technologies are performed in a sequence differing from that of the described method, and/or components such as a system, a structure, a device, and a circuit are coupled or combined in a way differing from that of the described method or are replaced with or substitute other components or equivalents, suitable results can be achieved.

Therefore, it should be understood that other embodiments and examples and equivalents of the accompanying claims belong to the scope of the accompanying claims.

What is claimed is:

1. A method for operating a plurality of machines capable of managing relations required to execute a task, the method comprising:
receiving, by a coordinating machine of the plurality of machines, a command to perform the task from a user;
individually forwarding, by the coordinating machine, the task to other machines of the plurality of machines;
analyzing, by each of the plurality of machines, the task and generating a capability set required to execute the task based on a result the analysis;
determining, by each of the plurality of machines, whether to participate in a machine group that is to execute the task, based on the generated capability set and a capability parameter and a status parameter of the respective machines;
transmitting, by the other machines which determined to participate in the machine group, a notification about whether to participate in the machine group, the capability set, the capability parameter and the status parameter of the respective other machines to the coordinating machine to generate a relation profile; and
operating the machines that participate in the machine group according to a schedule of processes included in the relation profile.

2. The method of claim 1, wherein the capability parameter includes a sub-parameter related to at least one of a title of an executable process, an input parameter, an output parameter, a process processing time, a process processing condition, and executable functions.

3. The method of claim 1, wherein the status parameter includes a sub-parameter related to at least one of a current active state, current availability or unavailability, a current process, a scheduled termination time for the current process, a currently executed task, a currently executed function, and a scheduled termination time of the currently executed function.

4. The method of claim 1, wherein:
a machine profile including information about the respective machines includes the capability parameter and the status parameter of the respective machines, and
the machine profile further includes at least one of a machine ID parameter, a user ID parameter, a group ID parameter, a machine operating system parameter, and a machine interface parameter.

5. The method of claim 4, wherein the machine operating system parameter includes a sub-parameter related to a type and a version of an operating system of the respective machines.

6. The method of claim 4, wherein the machine interface parameter includes a sub-parameter related to interfaces and interface protocols between the coordinating machine and the other machines.

7. The method of claim 1, further comprising:
receiving, by the coordinating machine, the capability set, the capability parameter and the status parameter from the other respective machines which determined to participate in the machine group, and forming the relations of the machine group based on the capability set, the capability parameter and the status parameter of the respective machines.

8. The method of claim 7, wherein the relations include information about the machine group and information about a task processing schedule of the machines that participate in the machine group.

9. The method of claim 8, further comprising:
generating, by the coordinating machine, the relation profile based on the relations, and transmitting the generated relation profile and the relation to the other machines that participate in the machine group.

10. The method of claim 9, wherein the relation profile includes at least one of a capability set parameter, a grouped machine parameter, a work group ID parameter, a task description parameter, and a task processing schedule parameter.

11. The method of claim 10, wherein the task processing schedule parameter includes a sub-parameter related to at least one of a process start time for each process, a process start condition, machine IDs of allocated machines, function that are used, a predicted termination time of the function, an interface parameter, and a process termination condition.

12. The method of claim 9, further comprising, after completing an execution of the command: releasing, by the machines that participate in the machine group, the formed relations.

13. The method of claim 9, further comprising:
requesting, by the coordinating machine, an intervention of the user according to a process included in the relation profile.

14. The method of claim 13, wherein the intervention of the user includes an approval or a selection of the user related to an execution of the process.

15. The method of claim 14, further comprising:
re-grouping, by the coordinating machine, the machines according to the approval or the selection of the user; and
forming, by the coordinating machine, new relations for the re-grouped machines.

16. The method of claim 15, further comprising:
generating, by the coordinating machine, a new relation profile based on the new relations.

17. A system, comprising:
a plurality of machines capable of managing relations to execute a task;
a user that transmits a command to perform the task to a coordinating machine of the plurality of machines,
wherein the coordinating machine individually forwards the task to other machines of the plurality of machines,
wherein each of the plurality of machines analyzes the task, generates a capability set required to execute the task based on the analysis, and determines whether to participate in a machine group that is to execute the task, among the plurality of machines, based on the generated capability set and a capability parameter and a status parameter of the respective machines,
wherein the other machines which determined to participate in the machine group transmits a notification about whether to participate in the machine group, the capability set, the capability parameter and the status parameter of the respective other machines to the coordinating machine of the machine group to generate a relation profile, and
wherein the machines that participate in the machine group operate according to a schedule of processes included in the relation profile.

* * * * *